United States Patent

Conrad et al.

[11] Patent Number: 6,156,100
[45] Date of Patent: Dec. 5, 2000

[54] METHOD AND APPARATUS FOR CONCENTRATING A GAS USING A SINGLE STAGE ADSORPTION ZONE

[75] Inventors: Wayne Ernest Conrad; Helmut Gerhard Conrad; Ted Szylowiec, all of Hampton, Canada

[73] Assignee: Fantom Technologies, Inc., Welland, Canada

[21] Appl. No.: 09/240,618

[22] Filed: Feb. 1, 1999

[51] Int. Cl.[7] .............................................. B01D 53/053
[52] U.S. Cl. .............................. 95/98; 95/100; 95/105; 95/130; 96/144
[58] Field of Search .......................... 95/96–106, 130, 95/138; 96/108, 130, 143, 144

[56] References Cited

U.S. PATENT DOCUMENTS

| | | | |
|---|---|---|---|
| 3,572,008 | 3/1971 | Hankison et al. | 96/144 X |
| 3,659,399 | 5/1972 | Kauer, Jr. et al. | 96/130 X |
| 3,796,022 | 3/1974 | Simonet et al. | 95/130 X |
| 4,013,429 | 3/1977 | Sircar et al. | 95/130 X |
| 4,302,224 | 11/1981 | McCombs et al. | 55/160 |
| 4,331,455 | 5/1982 | Sato | 55/21 |
| 4,342,573 | 8/1982 | McCombs et al. | 55/161 |
| 4,448,592 | 5/1984 | Linde | 55/68 |
| 4,477,264 | 10/1984 | Kratz et al. | 95/130 X |
| 4,534,346 | 8/1985 | Schlaechter | 96/144 X |
| 4,561,865 | 12/1985 | McCombs et al. | 95/130 X |
| 4,576,616 | 3/1986 | Mottram et al. | 55/68 |
| 4,636,226 | 1/1987 | Canfora | 96/130 X |
| 4,661,125 | 4/1987 | Haruna et al. | 55/26 |
| 4,853,015 | 8/1989 | Yoshino | 62/40 |
| 4,869,733 | 9/1989 | Stanford | 55/21 |
| 4,892,566 | 1/1990 | Bansal et al. | 95/130 X |
| 4,973,339 | 11/1990 | Bansal | 55/31 |
| 5,354,361 | 10/1994 | Coffield | 95/103 |
| 5,458,677 | 10/1995 | VanderMolen | 96/144 X |
| 5,518,526 | 5/1996 | Baksh et al. | 95/130 X |
| 5,520,720 | 5/1996 | Lemcoff | 95/130 X |
| 5,529,607 | 6/1996 | Tan | 95/130 X |
| 5,679,134 | 10/1997 | Brugerolle et al. | 95/130 X |
| 5,766,310 | 6/1998 | Cramer | 95/96 |
| 5,772,737 | 6/1998 | Andreani et al. | 95/130 X |
| 5,785,740 | 7/1998 | Brugerolle et al. | 95/130 X |
| 5,882,380 | 3/1999 | Sircar | 95/130 X |
| 5,928,610 | 7/1999 | Moran et al. | 95/130 X |
| 5,961,694 | 10/1999 | Monereau et al. | 95/130 X |
| 5,997,611 | 12/1999 | Doong et al. | 95/130 X |

Primary Examiner—Robert H. Spitzer
Attorney, Agent, or Firm—Philip C. Mendes da Costa; Bereskin & Parr

[57] ABSTRACT

A method and apparatus for operating a pressure swing adsorption process is disclosed that may utilize only a single adsorption stage yet still produce a continuous stream of a concentrated fluid.

24 Claims, 3 Drawing Sheets

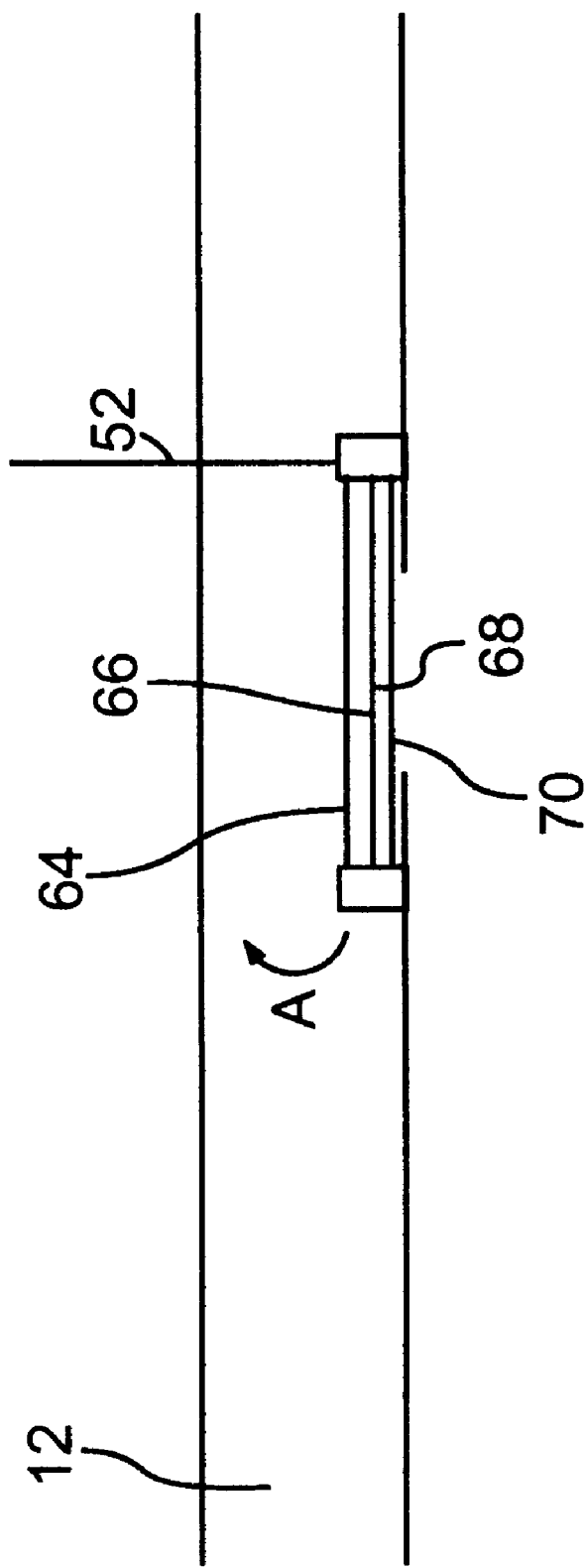

METHOD AND APPARATUS FOR CONCENTRATING A GAS USING A SINGLE STAGE ADSORPTION ZONE

FIELD OF THE INVENTION

This invention relates to a method and apparatus using a single adsorption zone for producing an enriched stream of a first gas from a stream containing the first gas and at least one second gas. In one embodiment, the method and apparatus may be used to obtain a concentrated stream of oxygen from air.

BACKGROUND OF THE INVENTION

Various different methods have been developed for separating gases and producing a concentrated stream of a selected gas. One particular method which has been used in industry is the pressure swing adsorption process. Generally, these processes use an adsorbent which, under elevated pressure conditions, preferentially adsorbs a targeted gas over other gases present in a gas stream. Accordingly, the adsorbent could be selected to preferentially adsorb an undesirable gas from a gas stream thereby leaving a gas stream having an increased concentration of the gases remaining in the gas stream. An example of such a process would be the use of a pressure swing adsorption process to produce an oxygen enriched air stream. The adsorbent would be selected to preferentially adsorb nitrogen over oxygen. Thus, after the adsorption process is conducted, the pressurized air in contact with the adsorbent contains a higher percentage by volume of oxygen. This oxygen enriched air may then be vented from the adsorption zone and the adsorbent purged (at reduced pressure conditions) to remove the adsorbed nitrogen. Alternately, such a process may be used to preferentially adsorb a targeted gas (e.g. oxygen) thereby also producing an enriched stream of oxygen.

Various different processes have been designed to utilize the selective adsorption ability of zeolite. Examples of these include, Bansal (U.S. Pat. No. 4,973,339), Stanford (U.S. Pat. No. 4,869,733) and Haruna et al (U.S. Pat. No. 4,661,125).

The process and apparatus of Bansal, Stanford and Haruna et al each utilize two adsorption zones. The use of two adsorption zones is undesirable as it unnecessarily complicates the apparatus since it requires additional valving and control means to cycle each adsorption bed through a pressurization cycle and a purging cycle. Further, this adds to the cost of the apparatus and decreases the reliability of the apparatus.

Other disadvantages of existing designs is the requirement to use expensive valve control means. In particular, solenoids are frequently required to switch the adsorption zone from a pressurization mode to a purging mode. These controls are expensive and also prone to failure after extensive use.

Further, existing designs utilize electronics (e.g. microprocessors) to control the cycling of the adsorption zone. This adds to the cost of the equipment and also requires an electrical power source to operate the process. Further, the electronic components may be damaged in harsh environments and this limits the applications of some existing designs.

SUMMARY OF THE INVENTION

Despite the fact the method and apparatus of the instant invention use only a single adsorption zone, the instant invention may provide a continual, relatively steady, flow of an enriched gas stream while the adsorption zone is being purged. Further, this stream of enriched gas may have a flow rate which is generally constant throughout the entire cycle of the adsorption zone from the pressurization (adsorption) stage to the purging (desorption) stage.

To this end, in accordance with the instant invention there is provided a concentrator for obtaining an enriched stream of a first gas from a gas containing the first gas and at least one second gas, the concentrator comprising:

(a) a pressurizable adsorption zone having an inlet port and containing a member for reversibly adsorbing the at least one second gas to produce the enriched stream;

(b) a storage container;

(c) a passageway extending between the pressurizable adsorption zone and the storage container, the storage container being expandable to an expanded position to store at least a portion of the enriched stream when the storage container is in flow communication with the pressurizable adsorption zone;

(d) a member positioned in the passageway and moveable between a first position in which the storage container is in flow communication with the pressurizable adsorption zone and a second position in which the storage container is isolated from the pressurizable adsorption zone;

(e) a purge valve associated with the pressurizable adsorption zone and moveable between a closed position and an open position in which the pressurizable adsorption zone can be purged; and, (f) an outlet port in flow communication with the storage container.

In accordance with another embodiment of the instant invention, there is provided a pressure swing adsorption apparatus for producing an enriched stream of a first gas from a gas containing the first gas and at least one second gas, the apparatus comprising:

(a) means for reversibly adsorbing the at least one second gas to produce the enriched stream;

(b) expandable storage means for storing at least a portion of the enriched stream;

(c) outlet means in flow communication with the storage container for venting the enriched stream from the apparatus;

(d) means for alternatingly connecting in flow communication and then isolating the expandable storage means and the means for reversibly adsorbing the at least one second gas; and, (e) purging means for removing at least a portion of the at least one second gas from the means for reversibly adsorbing the at least one second gas when the expandable storage means is isolated from the means for reversibly adsorbing the at least one second gas whereby the expandable storage means expands to store at least a portion of the enriched stream when the storage means is in flow communication with the means for reversibly adsorbing the at least one second gas.

In one embodiment, the storage container is drivingly connected to the purge valve, whereby the purge valve is moved to the open position when the storage container expands to the expanded position.

In another embodiment, the concentrator includes an actuator operatively mechanically connecting the storage container to the purge valve. The purge valve may be a mechanical valve.

In one embodiment, the storage container comprises a vessel having expandable walls and the vessel defines a reservoir for storing the enriched stream, the size of the reservoir increasing as the walls expand.

In an alternate embodiment the storage container comprises a vessel having a moveable member mounted therein and moveable between a first position and a second position, the vessel defines a reservoir for storing the enriched stream, and the size of the reservoir increases as the moveable member moves from the first position to the second position. The concentrator may include an actuator drivingly connecting the moveable member to the purge valve whereby movement of the moveable member from the first position towards the second position actuates the purge valve to move to the open position. Alternately, the member may be a pressure actuated valve whereby movement of the purge valve to the open position causes the pressure actuated valve to move to the closed position.

In another embodiment, the concentrator may also comprise a biasing member to bias the moveable member to the first position. The biasing member may be gravity if the moveable member is moved upwardly during the expansion mode. Alternately it may be an elastomeric member (eg. if the side walls resiliently expand outwardly during the expansion mode or if an elastomeric member is compressed during the expansion mode) or it may be a spring which is compressed during the expansion mode.

In a preferred embodiment, the concentrator comprises an oxygen concentrator to produce a concentrated stream of oxygen enriched gas. In a more preferred embodiment, the gas comprises air, the first gas is oxygen and the at least one second gas comprises nitrogen such that the concentrator produces an oxygen enriched stream of air.

In one embodiment, the flow of the enriched stream of the first gas through the outlet port is less than the flow of gas through the inlet port. The outlet port may be open at all times when the concentrator is in use.

The member preferably comprises an adsorbent such as a zeolite molecular sieve. If a stream of oxygen enriched air is to be obtained from air, the member may comprise a nitrogen adsorbent.

In accordance with another embodiment of the instant invention, there is provided a method for producing an enriched gas having an increased concentration of a first gas from a gas containing the first gas and at least one second gas comprising the steps of:
  (a) the step of introducing the gas into a vessel containing a member for adsorbing the at least one second gas;
  (b) the step of pressurizing the vessel for a time sufficient for the member to adsorb at least a portion of the second gas to produce the enriched gas;
  (c) the step of alternately passing the enriched gas to an expandable container having an outlet port to expand the container and isolating the expandable container from the vessel; and,
  (d) the step of purging the vessel when the expandable container is isolated from the vessel.

In accordance with another embodiment of the instant invention, there is provided a method for producing an enriched gas having an increased concentration of a first gas from a gas containing the first gas and at least one second gas comprising:
  (a) introducing the gas into a vessel containing an adsorbent for adsorbing the at least one second gas;
  (b) pressurizing the vessel for a time sufficient for the adsorbent to adsorb at least a portion of the second gas to produce the enriched gas;
  (c) opening a flow valve to connect the vessel in flow communication with an expandable container;
  (d) allowing the expandable container to expand to store at least a portion of the enriched gas;
  (e) opening a purge valve to purge the vessel and closing the flow valve after the expandable container has expanded by a preset amount;
  (f) purging at least a portion of the second gas from the vessel; and,
  (g) contracting the expandable container to release at least a portion of the enriched gas stored in the expandable vessel.

In one embodiment, the method further comprises the step of venting the enriched gas from the expandable container when the expandable container is isolated from the vessel.

In one embodiment, the method further comprises the step of venting the enriched gas from the expandable container at all times during the operation of the method.

In one embodiment, the method further comprises the step of automatically passing the enriched gas to the expandable container when the vessel reaches a preset pressure.

In one embodiment, the method further comprises the step of automatically purging the vessel when the expandable container expands by a preset amount.

In one embodiment, the method further comprises the step of automatically isolating the expandable container from the vessel upon the commencement of the step of purging the vessel.

A further advantage of the instant invention is that the expansion of the storage container (i.e. the reservoir for storing the enriched gas) may be used to actuate the purging cycle when the storage container expands to a desired level. Accordingly, an electronic controller is not required to time the process. Further, no gas sensors are required to determine when to actuate a particular part of the cycle of the adsorption zone.

A further advantage of the instant invention is that the expandable container may be drivingly linked to the purging valve. In this embodiment, simple actuation means may be used to move the purging valve to the open position so as to initiate the purging cycle. Accordingly, solenoids and other complicated switching apparatus are not required. Further, the expandable container may be operatively connected to the purge valve by mechanical linkages and, in addition, the purge valve may be a simple mechanical valve (e.g. a seat valve). Accordingly, no electrical power supply is required to initiate the purging cycle.

It will be appreciated that, according to the instant invention, a concentrator, and in a preferred embodiment an oxygen concentrator, may be designed wherein a source of pressurized gas (eg. air) which is fed to the adsorption zone is the driving source of the entire apparatus. Accordingly, the resultant device, which uses only an external motive force, may be manufactured as a lightweight reliable unit.

In accordance with the instant invention, the apparatus may be designed to trigger the end of the purging cycle and thereby commence the pressurization (adsorption) cycle as the expandable storage container contracts to a predetermined position. This position may be pre-determined based upon the volume of the adsorption zone and the time required to complete the purging cycle as well as the flow rate of enriched gas from the reservoir. In this way, a continual flow of enriched gas may be produced by the apparatus. Further, the apparatus is energy efficient since the timing of the cycles is based upon the actual completion of a cycle (i.e. the contraction of the expandable reservoir) as opposed to an electronic timing means which would initiate a cycle regardless of the concentration of the enriched gas exiting the apparatus.

BRIEF DESCRIPTION OF THE DRAWINGS

These and other advantages of the instant invention will be more fully and particularly understood in connection with the following description of a preferred embodiment of the invention in which.

DESCRIPTION OF PREFERRED EMBODIMENT

Figure 1:
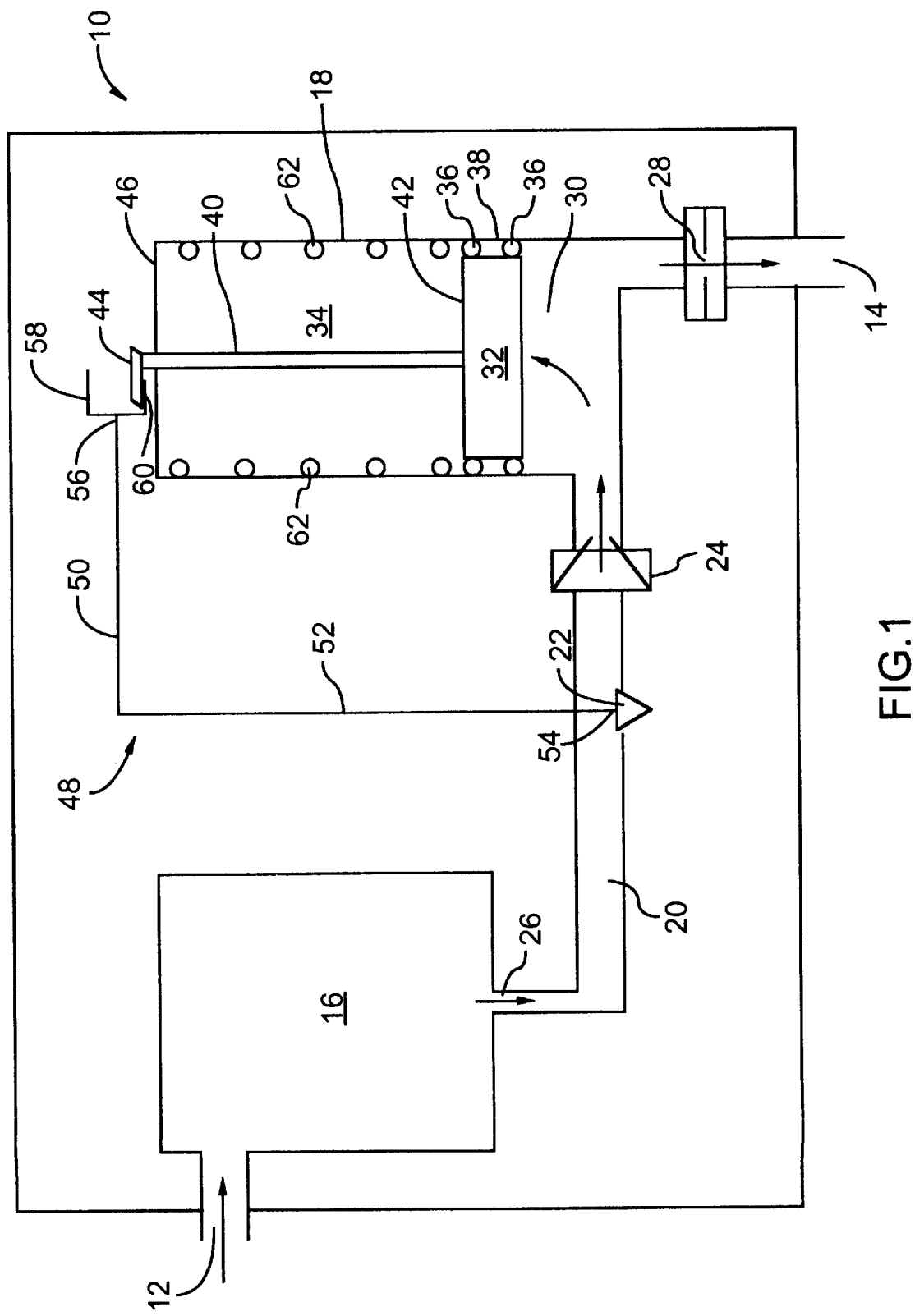
FIG. 1 is a view illustrating in diagrammatic form an apparatus according to the instant invention wherein the adsorption zone is supplying enriched gas to the expandable container.

Concentrator 10 comprises inlet port 12, outlet port 14, adsorption zone 16 and expandable container 18. Passageway 20 extends between adsorption zone 16 and expandable container 18. Passageway 20 is provided with purge valve 22 and valve 24.

Adsorption zone 16 may be of any particular construction which is known in the art for pressure swing adsorption apparatus. In the preferred embodiment, the adsorption zone 16 comprises a vessel distinct from expandable container 18 that may be subjected to an increased pressure during which a selected fluid is adsorbed into adsorption media provided in adsorption zone 16 leaving a fluid having an increased concentration of the remaining (unadsorbed) fluids in adsorption zone 16. It will be appreciated that adsorption zone 16 may comprise a bed containing the adsorbent material through which the fluid flows as it passes through adsorption zone 16.

The fluid may be a liquid or a gas. If the fluid is a liquid, then concentrator 10 may be used, for example, to selectively remove an impurity from a liquid stream (eg. the fluid selectively adsorbed into carbon) such as water or a pesticide. The concentrator may also be used for pressure swing fractional distillation.

In a preferred embodiment, the fluid is a gas and, more preferably, the concentrator is an oxygen concentrator. The following description is based upon the use of concentrator 10 as an oxygen concentrator; however, the concentrator may be used for other pressure swing operations of fluids.

If concentrator 10 is an oxygen concentrator, then the feed gas which is introduced into adsorption zone 16 via inlet port 12 comprises an oxygen containing gas and, more preferably, air. The adsorbent material in adsorption zone 16 accordingly comprises a material which selectively adsorbs nitrogen (the largest constituent of air) thereby leaving air containing an enriched level of oxygen in adsorption zone 16. Such adsorbent material are known in the art. Examples of such material are zeolites and, in a particularly preferred embodiment, the adsorbent is clinoptilolite.

It will be appreciated that, in an alternate embodiment, the desired product may be the fluid adsorbed onto the adsorbent media. In such a case, the product exiting purge valve 22 could be fed to a container or other apparatus as may be desired.

The remaining part of this description of the preferred embodiment is premised upon concentrator 10 including an adsorbent to remove nitrogen from air thereby producing a stream of oxygen enriched air. It is to be understood that the feed gas stream fed to adsorption stream 16 may comprise at least any two gases and the adsorbent material may be selected to adsorb the one or more of such gases leaving a gas stream having an enhanced concentration of the remainder of such gases.

Adsorption zone 16 operates under pressure. Accordingly, means must be provided to raise adsorption zone 16 to the desired pressure. In the preferred embodiment, the air fed to inlet port 12 comprises a stream of pressurized air (eg at a pressure of 5 to 30 psig). It will be appreciated that, in an alternate embodiment, a compressor or other means may be provided as part of apparatus 10 to feed an air stream into adsorption zone 16 and to pressurize adsorption zone 16 to the required pressure. The exact pressure which is required for the adsorption media to adsorb the targeted gas, and the length of the adsorption cycle, will depend on the thermodynamics of the adsorption media.

Valve 24 is provided in passageway 20 to alternately (i.e. cyclicly), connect adsorption zone 16 and expandable container 18 in flow communication and to then isolate adsorption zone 16 from expandable container 18. Valve 24 may be any member which is movable between a first position in which adsorption zone 16 is isolated from expandable container 18 and an open position in which adsorption zone 16 and expandable container 18 are in flow communication. Further, valve 24 may be positioned at any point between the two vessels. For example, valve 24 could be positioned as part of outlet port 26 of adsorption zone 16. Further, if adsorption zone 16 and expandable container 18 are a single unit separated by a wall (not shown), valve 24 may be positioned in the wall.

While adsorption zone 16 is undergoing the adsorption portion of the cycle, adsorption zone 16 is sealed sufficiently such that adsorption zone 16 will be raised to the required pressure. Preferably, no gas flow out of adsorption zone 16 is permitted during this part of the method. Accordingly purge valve 22 is preferably in the fully closed position shown in FIG. 1 and valve 24 is preferably in the fully closed position shown in FIG. 2. Adsorption zone 16 is thus isolated so as to allow pressure to build up therein. Due to the inflow of air through inlet port 12, pressure will build up in adsorption zone 16 and nitrogen will be adsorbed in the adsorbent media.

Based upon the volume of adsorption zone 16, the adsorption characteristics of the adsorbent in adsorption zone 16 and the rate of air input into adsorption zone 16, the length of time required to achieve the desired concentration of oxygen in the free gas in adsorption zone 16 may be calculated. Further, a person skilled in the art will be able to determine the pressure at which this desired oxygen concentration will be achieved.

Any valve mechanism (either mechanically or electrically operated) may be used for valve 24. Preferably, valve 24 is a pressure actuated member which will open to bring adsorption zone 16 into flow communication with expandable container 18 when adsorption zone 16 reaches the pressure at which the required oxygen concentration will have been achieved (eg. a check valve). One advantage of this approach is that valve 24 may open, and the adsorption cycle therefore terminate, when a desired preset pressure is achieved. Thus no sensors are required to monitor the progress of the adsorption cycle. The adsorption cycle automatically terminates when the requisite pressure is reached. Preferably, valve 24 is a mechanical member which is biased (eg. by a spring) to the closed position and which will open when the pressure upstream thereof (i.e. in adsorption zone 16 and in passageway 20) reaches a preset pressure (which may be the pressure at which the desired concentration of oxygen is achieved in the free gas in adsorption zone 16).

When valve 24 is in the open position shown in FIG. 1, oxygen enriched air will pass from adsorption zone 16 through passageway 20 and into expandable container 18.

Outlet port 14 is in flow communication which expandable container 18. When valve 24 is in the open position shown in FIG. 1, outlet port 14 is also, indirectly, in flow communication with adsorption zone 16. When valve 24 opens, expandable container 18 expands so as to receive at least a portion of the oxygen enriched air which exits adsorption chamber 16. Accordingly, outlet port 14 provides a flow of oxygen enriched air when valve 24 is open and the oxygen enriched air is passing into expandable container 18. Further, when valve 24 closes and adsorption zone 16 is isolated from expandable container 18, expandable container 18 preferably will have by then stored a sufficient supply of oxygen enriched air so that outlet port 14 may still provide a flow of oxygen enriched air even while adsorption chamber 16 is undergoing a purge cycle.

In a preferred embodiment, outlet port 14 has an aperture 28 which is open at all times when concentrator 10 is in operation. Aperture 28 is preferable of a pre-set opening size so as to provide a generally continuous flow of oxygen enriched air through outlet port 14. It will also be appreciated that, if desired, aperture 28 may have a variable opening size so as to vary the flow rate of oxygen enriched air through outlet port 14. This may be desirable if, for example the apparatus is used for medical purposes, eg. providing a source of oxygen enriched air to a patient. Further, aperture 28 may be operable so as to seal outlet port 14 (or alternately a valve to close outlet port 14 may be provided). This may be desirable if, for example there is backpressure from downstream equipment.

Preferably, expandable container 18 and aperture 28 are sized so that outlet 14 provides a generally constant flow rate of oxygen enriched air during both the adsorption cycle and the purge cycle of adsorption zone 16. To this end, outlet port 14 preferably has a reduced flow rate of gas therethrough than the flow rate of air into adsorption zone 16 via inlet port 12. Preferably, the flow rate of gas through outlet port 14 is about half that of the flow rate into inlet port 12. For example, if inlet 12 has a flow rate of 6–8 liters per minute of air, then outlet port 14 preferably has a flow rate therethrough of 2–4 liters per minute of oxygen enriched air. This flow rate may be achieved by, for example, selecting the cross sectional area of outlet port 14 or including a flow restriction, such as aperture 28, in outlet port 14, to achieve this result. It will be appreciated that two or more adsorption zones 16 may be connected to one or more expandable containers 16. A regulator could also be used to control the output rate from port 14.

Expandable container 18 may be any storage container for storing a gas which has an expandable reservoir 30 for storing at least a portion of the oxygen enriched gas produced in adsorption zone 16. In one preferred embodiment, expandable container 18 may be a storage vessel having expandable walls. In this embodiment, container 18 may have at least one wall which will expand when container 18 is subjected to an increased pressure. For example, one or more of the walls of container 18 may be composed of an elastomeric material. Alternately, in another preferred embodiment, container 18 may have a flexible side wall which is movable between a first, compacted position and a second expanded position when reservoir 30 is filled with oxygen enriched air. For example, expandable container 18 may be in the shape of a bellows.

Figure 2:
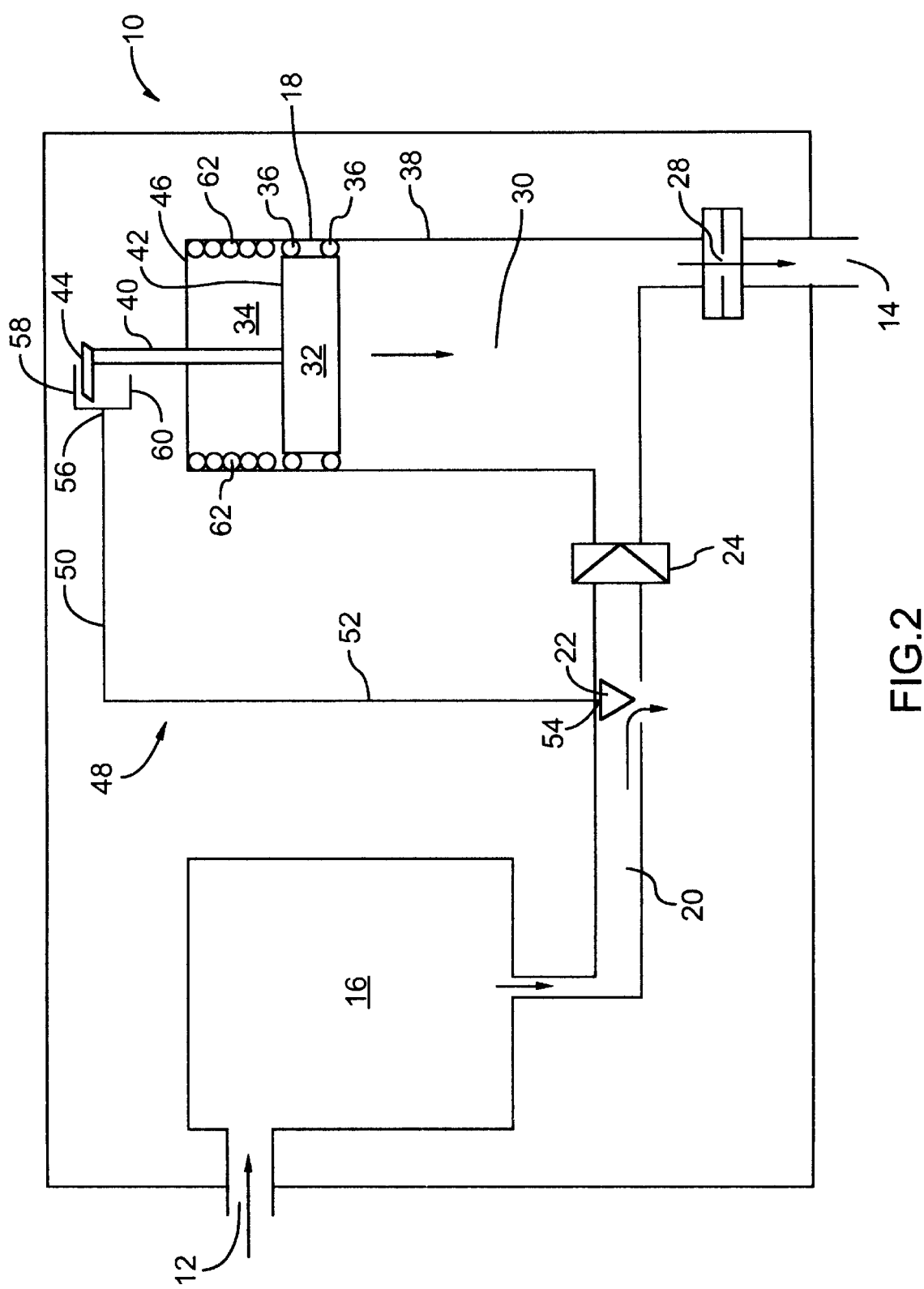
FIG. 2 is a further view illustrating in diagrammatic form the apparatus of FIG. 1 wherein the apparatus has commenced the purging cycle; and, FIG. 3 is a schematic diagram of an alternate purge valve.

Alternately, or in addition, container 18 may comprise a vessel having a movable member mounted therein and movable between a first position and a second position. The size of reservoir 30 increases as the movable member moves from the first position to the second position. An example of such a construction is shown in FIGS. 1 and 2. In these Figures, the movable member comprises piston 32.

In the embodiment of FIGS. 1 and 2, expandable container 18 is a longitudinally extending member and, is preferably vertically oriented. Piston 32 may be movably mounted in container 18 by any means known in the art. Further, piston 32, and the means for movably mounting piston 32 in container 18, preferably isolate reservoir 30 from upper portion 34 of container 18. In this way, the oxygen enriched gas which enters container 18 will remain in reservoir 30 instead of passing upwardly by piston 32 to upper portion 34. Piston 32 preferably moves upwardly into upper portion 34 of container 18 due solely to a pressure of the oxygen enriched stream passing through valve 24. Piston 32 may be so mounted by a plurality of O-rings 36 which are positioned between piston 32 and side wall 38 of container 18. The O-rings, in conjunction with piston 32 seal reservoir 30 from upper portion 34. However, it will be appreciated that other means, such as a bellows, bearings or a cam may be used to movably mount piston 32.

When the adsorption cycle of adsorption zone 16 is completed, valve 24 will open allowing a stream of oxygen enriched air to pass into container 18. At this time, piston 32 may be in approximately the position shown in FIG. 1 (i.e. in a contracted position towards the bottom of container 18). Oxygen enriched air will enter container 18 and pass through aperture 28 through outlet port 14. However, as the flow of oxygen enriched air through aperture 28 is restricted, pressure will build up in container 18 which will force piston 32 into upper portion 34. As additional oxygen enriched air enters container 18, the pressure will be maintained in container 18 and piston 32 will continue to move into upper portion 34, for example until the position shown in FIG. 2 is reached.

As oxygen enriched air exits adsorption zone 16, the pressure in adsorption zone 16 will decrease. For example, the pressure in adsorption zone 16 may reach 20 to 30 psig at the end of an adsorption cycle. As the pressure is reduced, for example to about 5 psig, nitrogen will commence being released by the zeolite thus decreasing the concentration of oxygen in the air exiting adsorption zone 16. At this time, it is desirable to purge the zeolite in adsorption zone 16. Advantageously, in one embodiment of the instant invention, the purge cycle may be commenced automatically.

In particular, apparatus 10 may include an actuator which drivingly connects the expandable container (e.g. piston 32) to purge valve 22 whereby movement of piston 32 from a first contracted position (as shown in FIG. 1) to a second expanded position (as shown in FIG. 2) actuates the purge valve to move it to the open position. As the flow rate of oxygen enriched air through aperture 28 may be predetermined and as the volume of container 18 is predetermined, a person skilled in the art may determine the distance through which piston 32 will travel as the oxygen enriched air exits adsorption chamber 16. By designing container 18 so as to permit piston 32 to move this distance, piston 32 may be in the upper position shown in FIG. 2 when the oxygen enriched air has been vented from adsorption zone 16 and the pressure in adsorption zone 16 has been reduced to a point wherein it is desirable to purge adsorption zone 16.

Preferably, piston 32 is drivingly connected to purge valve 22 so as to actuate purge valve 22 when piston 32 is in the upper position shown in FIG. 2. At that time, purge valve 22 will be in the open position allowing air to exit therethrough (as shown in FIG. 2). When purge valve 22 opens, the pressure in passage way 20 will drop to a sufficient degree such that valve 24 (which is preferably pressure operated) will close thus isolating reservoir 30 from adsorption zone 16. In this position, the pressurized air entering inlet port 12 may pass through the adsorbent material in adsorption zone 16, exit adsorption zone 16 via outlet port 26 and exit passageway 28 via the purge valve thereby removing the nitrogen which was releasable adsorbed by the adsorption media from apparatus 10.

The driving connection between piston 32 and purge valve 22 may be either mechanical or electrical but is preferably mechanical. As shown in FIGS. 1 and 2, extension member 40 extends upwardly from upper surface 42 of piston 32. Movable arm 44 is fixedly mounted to extension member 40. Accordingly, movable arm 44 moves longitudinal with respect to container 18 as piston 32 moves longitudinally within container 18. When piston 32 is in the contracted position shown in FIG. 1, moveable arm 44 is positioned adjacent surface 46 of container 18 and, when piston 32 is in the expanded position, as shown FIG. 2, moveable arm 44 is spaced a distance from surface 46 of container 18.

Movable arm 44 may be mechanically linked to purge valve 22 such as by connector member 48. Connector member 48 comprises a mechanical linkage which extends from movable arm 44 to purge valve 22. If container 18 extends vertically, then connector member 48 may have a first horizontal portion 50 and a second vertical portion 52 extending downwardly from the end of horizontal portion 50 distal to moveable arm 44. Connector member 48 has a first end 54 which is operatively connected to purge valve 22 and a second end 56 which is positioned to engage and be actuated by movable arm 44.

If container 18 is vertically disposed, then connector member 48 may be operatively engaged by movable arm 44 so as to move first end 54 upwardly as piston 32 moves upwardly and to move first end 54 downwardly as piston 32 moves downwardly. This may be achieved by having at least a first arm 58 provided on second end 56. As container 18 expands, piston 32 moves upwardly. At some point, movable arm 44 will engage first arm 58. Further movement of piston 32 will cause first arm 58 to move upwardly (due to its engagement with movable arm 44). As moveable arm 58 moves upwardly, purge valve 22 is moved to the open position. When purge valve 22 has been opened a sufficient amount of time, valve 24 will close and adsorption zone 16 will be purged. During this purging cycle, piston 32 will move downwardly into reservoir 30 thereby forcing oxygen enriched air through aperture 28. The movement of piston 32 may be due to the pressure of gravity (if container 18 is vertically disposed). In addition, or alternately, a biasing member, such as spring 62 may urge piston 32 downwardly to the contracted position.

As air exits aperture 28, piston 32 will move downwardly and, accordingly, arm 44 will move downwardly. If purge valve 22 is a vertically operable valve, then purge valve 22 may cause first arm 58 to move downwardly in conjunction with movable arm 44 (such as by the force of gravity and/or a biasing means urging purge valve 22 to the closed position) thus closing purge valve 22. Alternately, or in addition, second end 56 may have a second arm 60. In this embodiment, vertical portion 52 is a generally non-compressible member (eg. a rod) and as piston 32 moves downwardly, movable arm 44 will engage second arm 60 thereby driving first end 54 downwardly so as to close purge valve 22.

Preferably, connector member 48 moves essentially only due to movable arm 44 pushing up longitudinally outwardly on first arm 58 and longitudinally inwardly on second arm 60. Further, arms 58 and 60 are preferably spaced apart. In this way, piston 32 will move upwardly a defined amount before causing purge valve 22 to open thus allowing reservoir 30 to be filled a preset amount before the purge cycle commences. Further, piston 32 may move downwardly by a preset amount until it engages second arm 60 thereby closing purge valve 22 and completing the purging cycle. The distance between the arms is preferably sufficient to allow the purging cycle to be conducted while piston 32 is still pumping air from reservoir 30 through aperture 28. In a particularly preferred embodiment, by the time piston 32 is in the contracted position shown in FIG. 1, purge valve 22 has been closed for a sufficient amount of time to allow adsorption zone 16 to have reached the requisite pressure to have produced an oxygen enriched stream and to cause valve 24 to open. Thus, a continuous supply of oxygen enriched air through aperture 28 may be obtained.

In this embodiment, it may be seen that the actuator for purge valve 22 is a mechanical linkage comprising member 40, movable arm 44 and connector 48. Purge valve 22 is accordingly actuated by vertical movement of piston 32. Purge valve 22 is preferably a mechanical valve that is moved to the open position by vertical motion of connector 48. An example of such a valve is a seat valve which is lifted upwardly by upward motion of first end 54. However, other valves, such as a gate valve or a ball valve which may be opened to an open position by vertical motion of first end 54 may be utilized.

In an alternate embodiment, arms 40, 58 and 60 may define electrical connections and contact between arms 44 and 58 may actuate a circuit to open purge valve 22 and connection between arm 44 and arm 60 may consequentially close the circuit to close purge valve 22. For example, vertical portion 52 may be composed of a bimetal member or a muscle wire which contracts when heated. When movable arm 44 contacts first arm 58, an electrical connection may be made causing an electrical current to flow through vertical portion 52 thereby heating the vertical portion and causing it to contract. This contraction will cause purge valve 22 to open. When the electrical connection is broken (i.e. arm 44 is no longer in contact with first arm 58 or alternately the circuit is broken when movable arm 44 contacts second arm 60) the current flow through vertical potion 52 will be terminated thus allowing vertical portion 52 to cool and expand thereby sealing purge valve 22.

An alternate embodiment of purge valve 22 is shown in FIG. 3. In this embodiment, the purge valve comprises a bi-metal strip 64 having an outer metal member 66 affixed to an inner metal member 68. The two metals have different thermal coefficients of expansion. Accordingly, when contact is made between arms 44 and 58, an electrical connection may be made causing an electric current to pass, eg. via an electrically conductive member 48, to and through bi-metal strip 64 thereby heating the strip. If the inner metal member 68 has a greater thermal expansion than the outer metal member 66, the heating of bi-metal strip 64 will cause the bi-metal strip 64 to bend inwardly in the direction of arrow A thereby uncovering opening 70 so that the purge cycle may begin. When movable arm 44 engages arm 60, or brakes contact with first arm 58, the circuit may be closed causing the electric heating current to terminate and allowing bi-metal strip 64 to cool. When bi-metal strip 64 cools, inner metal member 68 will contract more than the outer metal member 66 thereby causing the bi-metal strip to curve downwardly and close opening 70. In an alternate embodiment, it will be appreciated that bi-metal strips 64 may be positioned on the outside passageway 20.

In a further alternate embodiment, valve 22 may be actuated by a solenoid. Once again, contact between movable arm 44 and first arm 58 may complete an electric circuit so as to actuate a solenoid to open any desired valve which may function as a purge valve. When movable arm 44 engages arm 60, or brakes contact with first arm 58, the circuit may be closed causing the solenoid to move to its starting position thereby closing the purge valve.

By constructing a concentrator according to the instant invention, a concentrator may be constructed whereby the pressurized air fed to adsorption zone 16 may be the only motive force to open purge valve 22 and valve 24. Further, it provides the requisite motive force to cause container 18 to expand. Thus, by using simple mechanical linkages and movable or expandable elements, a gas concentrator having a simple, rugged construction may be developed.

In addition, aperture 28 may be in an open position at all times so as to provide a continual supply of enriched gas to outlet 14 even when adsorption chamber 16 is being purged. This is due to reservoir 30 contracting during the purge cycle thereby driving the enriched stored gas from reservoir 30 to aperture 28.

Another advantage of the instant invention is that the expansion of container 18 may be used to time the purging cycle of adsorption zone 16. Accordingly, electronic timers or concentration sensors are not required to provide input to a controller to determine when the purge cycle should be commenced or terminated.

We claim:

1. A method for producing an enriched fluid having an increased concentration of a first fluid from a stream containing the first fluid and at least one second fluid comprising the steps of:
   (a) the step of introducing the stream into a vessel containing a member for adsorbing the at least one second fluid;
   (b) the step of passing the enriched fluid to an expandable container having an outlet port to expand the container; and,
   (c) the step of utilizing the expansion of the container to actuate the purging of the vessel.

2. The method as claimed in claim 1 further comprising the step venting the enriched fluid from the expandable container when the expandable container is isolated from the vessel.

3. The method as claimed in claim 1 further comprising the step venting the enriched fluid from the expandable container at all times during the operation of the method.

4. The method as claimed in claim 1 further comprising the step cyclically isolating the expandable container from the vessel and purging the vessel when the vessel is isolated from the expandable container.

5. A concentrator for obtaining an enriched stream of a first fluid from a stream containing the first fluid and at least one second fluid, the concentrator comprising:
   (a) a single pressurizable adsorption zone having an inlet port and containing a member for reversibly adsorbing the at least one second fluid to produce the enriched stream;
   (b) a storage container;
   (c) a passageway extending between the pressurizable adsorption zone and the storage container, the storage container being expandable to an expanded position to store at least a portion of the enriched stream when the storage container is in flow communication with the pressurizable adsorption zone;
   (d) a member positioned in the passageway and moveable between a first position in which the storage container is in flow communication with the pressurizable adsorption zone and a second position in which the storage container is isolated from the pressurizable adsorption zone;
   (e) a purge valve associated with the pressurizable adsorption zone and moveable between a closed position and an open position in which the pressurizable adsorption zone can be purged; and,
   (f) an outlet port in flow communication with the storage container, the outlet port is sized so that the outlet provides a flow of the enriched stream while the pressurizable adsorption zone is being purged.

6. The concentrator as claimed in claim 1 wherein the storage container comprises a vessel having expandable walls, the vessel defining a reservoir for storing the enriched stream, the size of the reservoir increasing as the walls expand.

7. The concentrator as claimed in claim 1 wherein the fluid comprises air, the first fluid is oxygen and the at least one second fluid comprises nitrogen.

8. The concentrator as claimed in claim 7 wherein the member comprises a nitrogen adsorbent.

9. The concentrator as claimed in claim 7 wherein the member comprises a zeolite molecular sieve.

10. The concentrator as claimed in claim 5 wherein the flow of the enriched stream of the first fluid through the outlet port is less than the flow of fluid through the inlet port.

11. The concentrator as claimed in claim 5 wherein the member comprises an adsorbent.

12. A concentrator for obtaining an enriched stream of a first fluid from a stream containing the first fluid and at least one second fluid, the concentrator comprising:
   (a) a pressurizable adsorption zone having an inlet port and containing a member for reversibly adsorbing the at least one second fluid to produce the enriched stream;
   (b) a purge valve associated with the pressurizable adsorption zone and moveable between a closed position and an open position in which the pressurizable adsorption zone can be purged;
   (c) a storage container;
   (d) a passageway extending between the pressurizable adsorption zone and the storage container, the storage container being expandable to an expanded position to store at least a portion of the enriched stream when the storage container is in flow communication with the pressurizable adsorption zone, the storage container is drivingly connected to the purge valve, whereby the purge valve is moved to the open position when the storage container expands to the expanded position; and,
   (f) an outlet port in flow communication with the storage container.

13. The concentrator as claimed in claim 12 further comprising an actuator operatively mechanically connecting the storage container to the purge valve.

14. The concentrator as claimed in claim 13 wherein the purge valve is a mechanical valve.

15. A concentrator for obtaining an enriched stream of a first fluid from a stream containing the first fluid and at least one second fluid, the concentrator comprising:
   (a) a pressurizable adsorption zone having an inlet port and containing a member for reversibly adsorbing the at least one second fluid to produce the enriched stream;
   (b) a storage container comprising a vessel having a moveable member mounted therein and moveable between a first position and a second position, the vessel defining a reservoir for storing the enriched stream, the size of the reservoir increasing as the moveable member moves from the first position to the second position whereby, the storage container is expandable to an expanded position;
   (c) a passageway extending between the pressurizable adsorption zone and the storage container;
   (d) a purge valve associated with the pressurizable adsorption zone and moveable between a closed position and an open position in which the pressurizable adsorption zone can be purged; and,
   (e) an outlet port in flow communication with the storage container.

16. The concentrator as claimed in claim 15 further comprising an actuator drivingly connecting the moveable member to the purge valve whereby movement of the moveable member from the first position towards the second position actuates the purge valve to move to the open position.

17. The concentrator as claimed in claim 16 further comprising a biasing member to bias the moveable member to the first position.

18. The concentrator as claimed in claim 15 wherein the member is a pressure actuated valve whereby movement of the purge valve to the open position causes the pressure actuated valve to move to the closed position.

19. A pressure swing adsorption apparatus for producing an enriched stream of a first fluid from a stream containing the first fluid and at least one second fluid, the apparatus comprising:
   (a) means for reversibly adsorbing the at least one second fluid to produce the enriched stream;
   (b) expandable storage means for storing at least a portion of the enriched stream;
   (c) outlet means in flow communication with the storage container for venting the enriched stream from the apparatus;
   (d) means for alternatingly connecting in flow communication and then isolating the expandable storage means and the means for reversibly adsorbing the at least one second fluid; and,
   (e) purging means for removing at least a portion of the at least one second fluid from the means for reversibly adsorbing the at least one second fluid when the expandable storage means is isolated from the means for reversibly adsorbing the at least one second fluid;
   (f) actuating means operatively connecting the expandable storage means to the purging means whereby the purging means is actuated when the expandable storage means expands by a set amount whereby the expandable storage means expands to store at least a portion of the enriched stream when the storage means is in flow communication with the means for reversibly adsorbing the at least one second fluid.

20. The apparatus as claimed in claim 19 wherein the outlet means includes a member to vent the storage container at all times while the apparatus is in operation.

21. The apparatus as claimed in claim 19 wherein the actuating means comprises a mechanical linkage.

22. The apparatus as claimed in claim 19 wherein element (a) operates under pressure and element (d) is actuated to connect the expandable storage means in flow communication with the means for reversibly adsorbing the at least one second fluid when element (a) reaches a pressure sufficient for at least a portion of the second fluid to be adsorbed.

23. The apparatus as claimed in claim 22 wherein the expandable storage means is biased to a contracted position.

24. The apparatus as claimed in claim 23 wherein the fluid comprises air, the first fluid is oxygen and the at least one second fluid comprises nitrogen.

* * * * *